(12) United States Patent
Ukai et al.

(10) Patent No.: US 7,279,142 B2
(45) Date of Patent: Oct. 9, 2007

(54) HYDROGEN REFINING APPARATUS

(75) Inventors: Kunihiro Ukai, Ikoma (JP); Kiyoshi Taguchi, Moriguchi (JP); Takeshi Tomizawa, Ikoma (JP); Seiji Fujiwara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 175 days.

(21) Appl. No.: 10/980,463

(22) Filed: Nov. 3, 2004

(65) Prior Publication Data

US 2005/0138863 A1 Jun. 30, 2005

Related U.S. Application Data

(62) Division of application No. 10/110,831, filed as application No. PCT/JP01/06890 on Aug. 10, 2001, now abandoned.

(30) Foreign Application Priority Data

| Aug. 18, 2000 | (JP) | ............................. 2000-248363 |
| Aug. 18, 2000 | (JP) | ............................. 2000-248363 |
| Oct. 23, 2000 | (JP) | ............................. 2000-323062 |
| Oct. 23, 2000 | (JP) | ............................. 2000-323062 |

(51) Int. Cl.
*B01D 50/00* (2006.01)
*C10J 3/20* (2006.01)

(52) U.S. Cl. .......................................... 422/177; 48/85
(58) Field of Classification Search ............ 422/197 R, 422/127.9, 198.3, 170–190, 198, 211; 48/197 R, 48/127.9, 198.3
See application file for complete search history.

(56) References Cited

U.S. PATENT DOCUMENTS 4,177,252 A 12/1979 Chinchen 4,522,894 A 6/1985 Hwang et al.
4,708,946 A 11/1987 Ohata et al.

FOREIGN PATENT DOCUMENTS

EP 0 602 864 A 6/1994
EP 0 985 635 3/2000

(Continued)

OTHER PUBLICATIONS

Supplementary European Search Report for Application No. EP 01 95 5648, dated Aug. 2, 2005.

(Continued)

*Primary Examiner*—Glenn Caldarola
*Assistant Examiner*—Tom P. Duong
(74) *Attorney, Agent, or Firm*—RatnerPrestia

(57) ABSTRACT

It was difficult to acquire a good CO cleanup efficiency in a hydrogen refining apparatus, for instance, when the start-up and stop operations are frequently repeated.

A hydrogen refining apparatus, including a shifter having a shifting catalyst body containing noble metals and metal oxides, and a reforming section for supplying hydrogen gas containing carbon monoxide to the shifter, (1) the temperature of an upstream side of the shifting catalyst body relative to the hydrogen gas flow being substantially between 300° C. and 500° C. and (2) the temperature of a downstream side of the shifting catalyst body relative to the hydrogen gas flow being substantially at 300° C. or less.

5 Claims, 7 Drawing Sheets

FOREIGN PATENT DOCUMENTS

| | | |
|---|---|---|
| EP | 1 046 612 | 10/2000 |
| EP | 1 136 442 A | 9/2001 |
| FR | 2 567 866 A | 1/1986 |
| JP | 11-115101 | 4/1999 |
| JP | 2000-119004 | 4/2000 |
| JP | 2000-178007 | 6/2000 |
| JP | 2000-302410 | 10/2000 |
| JP | 2001-180912 | 7/2001 |
| JP | 2001-316682 | 11/2001 |

OTHER PUBLICATIONS

Japanese Search Report for PCT/JP01/06890 dated Dec. 11, 2001.
English translation of Form PCT/ISA/210 dated Jul. 26, 2005.
L. Mendelovici, et al., "Methanation and Water-gas Shift Reactions over Pt/CeO$_2$," 1985, vol. 96, pp. 285-287.

HYDROGEN REFINING APPARATUS

This application is a divisional of U.S. patent application Ser. No. 10/110,831, filed Aug. 26, 2002, now abandoned which is a U.S. National Phase Application of PCT International Application PCT/JP01/06890 filed on Aug. 10, 2001.

TECHNICAL FIELD

The present invention relates to a hydrogen refining apparatus for reducing carbon monoxide generated when hydrocarbon components and water are reformed.

BACKGROUND ART

A cogeneration system using fuel cells of a high power generation efficiency receives attention as a decentralized generating set that can effectively utilize energy, and most fuel cells such as a commercialized phosphoric acid type fuel cell and a polymer type fuel cell under development generate electricity using hydrogen as fuel.

Currently, fuel infrastructures for hydrogen are not established, and so hydrogen needs to be generated at the installation sites. Accordingly, the steam reforming process or autothermal process, wherein hydrocarbon components such as natural gas and LPG, alcohols including methanol, or naphtha components, etc. as raw materials are allowed to react with water to generate hydrogen at a reforming section with a reforming catalyst, is utilized as a hydrogen generating method.

In such a reforming reaction of water with the raw materials, carbon monoxide is formed as a by product. For a polymer type fuel cell, which operates at low temperature, carbon monoxide acts as a poisoning component for the electrode catalyst of the fuel cell, and therefore a shifter for accomplishing shift reaction of water and carbon monoxide to hydrogen and carbon dioxide is employed along with a cleanup section for oxidizing carbon monoxide or converting it into methane.

Normally, the shifter uses both a Fe—Cr based catalyst and a Cu—Zn based catalyst. Since the Fe—Cr based catalyst is used at a comparatively high temperature (300° C. to 500° C.), carbon monoxide cannot be decreased to a large extent. On the other hand, the Cu—Zn based catalyst can decrease carbon monoxide to a considerably low concentration because it is used at a relatively low temperature (200° C. to 300° C.).

Thus, the shifter lowers the concentration of carbon monoxide to about 0.5% using a Cu—Zn based catalyst; the cleanup section uses a catalyst based on Pt or Ru, a platinum series noble metal to selectively oxidize carbon monoxide or convert it into methane and finally lowers the concentration of carbon monoxide to about 20 ppm (Certainly, the shifter should stably reduce the amount of carbon monoxide in order to reduce its quantity effectively in the cleanup section).

Nevertheless, the shifting catalyst of the Cu—Zn system is active in the shift reaction in a reduced state, and during the continuous operation of the equipment, the catalyst always remains in a reduced state, resulting in almost no degradation of the catalyst activity. However, in an intermittent operation, start-up and stop are repeated, so the shifter comes to contain air, which oxidizes the catalyst leading to an extensive reduction in the catalyst activity.

Hence, for applications wherein the start-up and stop operation are repeated frequently, when a hydrogen generating device with a Cu—Zn based catalyst is used in the shifter, carbon monoxide cannot be decreased sufficiently due to the oxidation of the shifting catalyst. When, for instance, the catalyst is used at an elevated temperature of 300° C. or more the catalyst activity is also degraded (Accordingly, the CO cleanup efficiency is also decreased).

In addition, in Japanese Patent Application No. 11-115101, a catalyst prepared by incorporating a metal of the platinum series noble metals into a metal oxide is used as a shifting catalyst in order to improve both oxidation resistance and heat resistance. The catalyst prepared by incorporating the metal of the platinum series noble metals into a metal oxide exhibits excellent features; the catalyst scarcely causes aggregation due to sintering of the catalyst species or does not change its activity in the oxidized state even if it is used at a temperature of about 500° C. However, the catalyst slightly declines in shift reactivity at low temperature as compared with the Cu—Zn based catalyst, which leads to an increase in the concentration of the carbon monoxide at the outlet of the shifter.

DISCLOSURE OF THE INVENTION

The present invention is made in view of the above described previous problems, and it is an object of the invention to provide a hydrogen refining apparatus of a good CO cleanup efficiency even when the start-up and stop operations are repeated frequently, for instance.

One aspect of the present invention is a hydrogen refining apparatus comprising:

a shifter having a shifting catalyst body containing noble metals and metal oxides for converting carbon monoxide; and a hydrogen gas supplying section for supplying hydrogen gas containing carbon monoxide to said shifter, wherein (1) the temperature of an upstream side of said shifting catalyst body relative to said hydrogen gas flow is substantially between 300° C. and 500° C. and (2) the temperature of a downstream side of said shifting catalyst body relative to said hydrogen gas flow is substantially at 300° C. or less.

Another aspect of the present invention is the hydrogen refining apparatus, wherein said shifter having a cooling section for keeping the temperature of said downstream side between 150° C. and 300° C.

Still another aspect of the present invention is the hydrogen refining apparatus, wherein the amount of said noble metals per volume of said shifting catalyst body is smaller in said upstream side than in said downstream side.

Yet still another aspect of the present invention is the hydrogen refining apparatus according to claim 1, wherein the flow rate of said hydrogen gas is larger in said upstream side than in said downstream side.

Still yet another aspect of the present invention is the hydrogen refining apparatus, wherein the cross-sectional area of said shifting catalyst body perpendicular to said hydrogen gas flow is smaller in said upstream side than in said downstream side.

A further aspect of the present invention is a hydrogen refining apparatus comprising:

a plurality of stages of a shifter having a shifting catalyst body containing both noble metals and metal oxides for converting carbon monoxide; and a hydrogen gas supplying section for supplying hydrogen gas containing carbon monoxide to said plurality of stages of said shifter, wherein the temperature of a stage of said shifter having said plurality of stages is higher in a more upstream side relative to said hydrogen gas flow.

A still further aspect of the present invention is the hydrogen refining apparatus, wherein said noble metals are all or a part of Pt, Pd, Rh and Ru, and said metal oxides are composite oxides made by compounding Zr and/or Al with Ce.

A yet further aspect of the present invention is the hydrogen refining apparatus, wherein said composite oxides are, excluding oxygen, composed of 5 to 90 atomic percent of Ce, the balance being Zr and/or Al.

A still yet further aspect of the present invention is the hydrogen refining apparatus, wherein the composite oxides are in the form of a solid solution.

An additional aspect of the present invention is the hydrogen refining apparatus, wherein the composition proportion of Ce in a stage of said shifting catalyst body is larger in a more upstream side relative to said hydrogen gas flow.

A still additional aspect of the present invention is the hydrogen refining apparatus, wherein (1) between said hydrogen gas supplying section and said shifter, or (2) between said converting catalyst bodies in respective stages is installed a cooling section used for cooling said hydrogen gas.

BRIEF DESCRIPTION OF THE DRAWINGS

FIG. 2(*b*) shows the catalyst temperature vs. the carbon monoxide concentration, when a gas composed of 2% of carbon monoxide, 18% of carbon dioxide and 80% of hydrogen, and adjusted to the dew point of 65° C., is passed through the catalyst;

DESCRIPTION OF SYMBOLS

Figure 1:
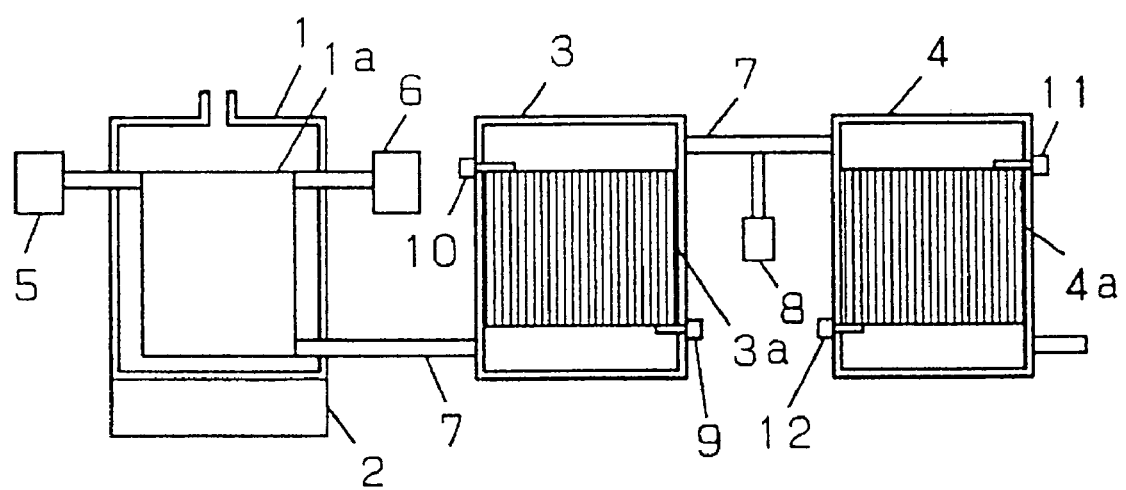
FIG. 1 is a longitudinal section of the principal positions of a hydrogen refining apparatus in an Embodiment 1 of the present invention.

1 Reforming section
1*a* Reforming catalyst body
2 Heating section
3 Shifter
3*a* Shifting catalyst body
4 Cleanup section
4*a* Cleanup catalyst body
5 Raw material supplying section
6 Water supplying section
7 Gas passage pathway
8 Air supplying section
9 Conversion No. 1 temperature measurement section
10 Conversion No. 2 temperature measurement section
11 Cleanup No. 1 temperature measurement section
12 Cleanup No. 2 temperature measurement section
13 Conversion cooling section
14 Conversion No. 3 temperature measurement section
15 Conversion cooling fan
101 Catalyst body
102 Reaction chamber
103, 115 Reformed gas inlet
104, 116 Reformed gas outlet
105, 117 Diffusing plate
106, 118 Insulating material
111 No. 1 catalyst body
112 No. 1 reaction chamber
113 No. 2 catalyst body
114 No. 2 reaction chamber
119 Cooling fan

BEST MODE FOR CARRYING OUT THE INVENTION

Now, embodiments according to the present invention will be described with reference to drawings.

EMBODIMENT 1

Firstly, referring to FIG. 1 illustrating in longitudinal section the principal portions of a hydrogen refining apparatus in the Embodiment 1 of the present invention, the arrangement of the hydrogen refining apparatus in this embodiment will be described.

In FIG. 1, a reforming section 1 is means (hydrogen gas supplying section) of supplying hydrogen (gas), equipped with a reforming catalyst body 1*a* used for the steam reforming reaction (a material made by the incorporation of a noble metal into an alumina base (Ru/alumina, N.E. CHEMCAT CORPORATION) was used for the reforming catalyst body 1*a*).

A heating section 2 is means of heating the reforming section 1 (flame burner in this embodiment).

A shifter 3, which contains a (CO) shifting catalyst body 3*a*, is means of converting the carbon monoxide (a material made by incorporating a catalyst including Pt and an oxide of Ce in an alumina pellet was used for the shifting catalyst body 3*a*).

A cleanup section 4, which contains a cleanup catalyst body 4*a*, is means of cleaning up the carbon monoxide (a material made by incorporating a Pt catalyst as a member in a cordierite honeycomb was used for the cleanup catalyst body 4*a*).

A raw material supplying section 5 is means of supplying a raw material mainly containing hydrocarbons for the steam reforming reaction to the reforming section 1; a water supplying section 6 is means of supplying water for the steam reforming reaction to the reforming section 1. A gas passage pathway 7 is means of flowing the gas to the reforming section 1, the shifter 3 and the cleanup section 4 in that order and the cleanup section 4 has an outlet.

An air supplying section 8 is means of supplying air as an oxidizing gas to the gas passage pathway 7 between a shifter 3 and a cleanup section 4.

A shift No. 1 temperature measurement section 9 is means of detecting the temperature of the gas before the gas passes through a shifting catalyst body 3a and a shift No. 2 temperature measurement section 10 is means of detecting the temperature of the gas after the gas passes through the shifting catalyst body 3a; these sections are both installed in the shifter 3. In addition, as will be described later, the temperature of the shifter 3 is controlled (set) on the basis of the results of the gas temperature measurements at both the shift No. 1 temperature measurement section 9 and the shift No. 2 temperature measurement section 10.

A cleanup No. 1 temperature measurement section 11 is means of detecting the temperature of the gas before the gas passes through a cleanup catalyst body 4a and a cleanup No. 2 temperature measurement section 12 is means of detecting the temperature of the gas after the gas passes through the cleanup catalyst body 4a; these sections are both installed in the cleanup section 4.

Next, the operation of the hydrogen refining apparatus in this embodiment will be depicted.

At first, a reforming heating section 2 is operated and then the reforming catalyst body 1a of the reforming section 1 is heated to a temperature of 700 to 750° C. (Although a flame burner was used as the reforming heating section 2, but any heating means that can provide a target heating temperature may be used).

Next, the steam reforming reaction is allowed to proceed by supplying the raw material of hydrocarbon components from a raw material supplying section 5 and water from a water supplying section 6, to a reforming catalyst body 1a that is being heated. The gas after the reforming section passes through the gas passage pathway 7 to the shifter 3.

While the Fe—Cr based catalyst or Cu—Zn based catalyst is frequently used in the shifter, in order to improve the oxidation resistance and heat resistance of the part, in this embodiment, a catalyst prepared from a noble metal and a metal oxide, specifically Pt and an oxide of Ce, was used in the shifter.

In particular, this catalyst shows a high heat resistance temperature compared to the Cu—Zn based catalyst and does not decrease in its catalyst activity as well even when the catalyst is in oxidation state during a stop of the operation. However, the catalyst slightly decreases in shift reactivity at low temperature compared to the Cu—Zn based catalyst. Thus, the concentration of the carbon monoxide at the outlet of the shifter tends to increase.

In this embodiment, the apparatus was operated with the part located upstream to the hydrogen gas flow of the shifting catalyst body being set in the temperature range of 300° C. to 500° C. and with the part positioned downstream from the hydrogen gas flow set in the temperature range of 150° C. to 300° C.

Figure 2A:
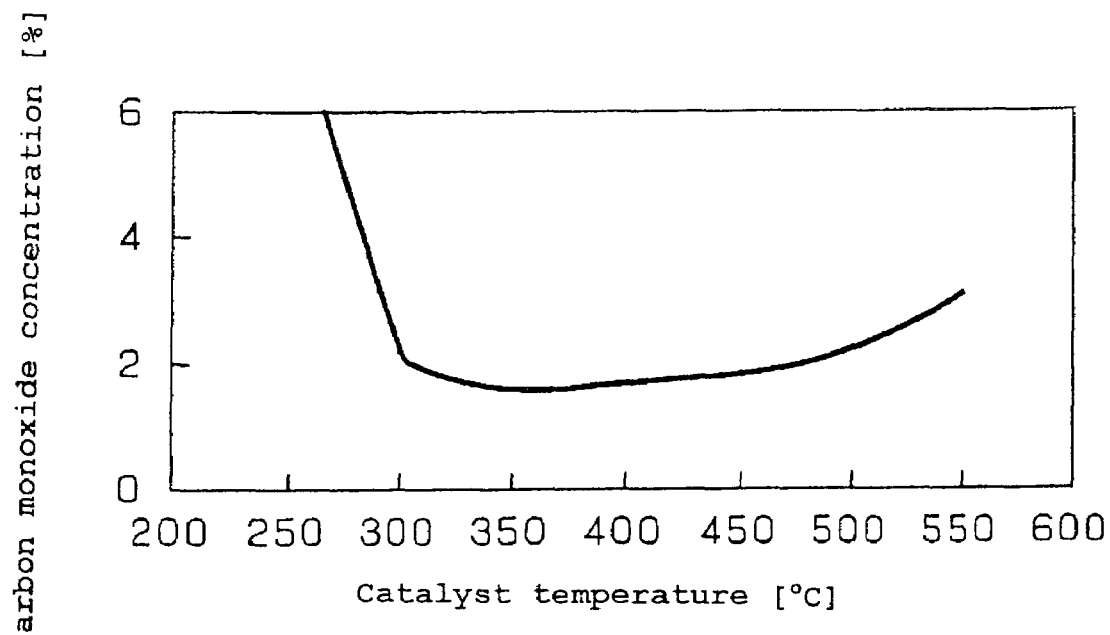
FIG. 2(*a*) shows the catalyst temperature vs. the carbon monoxide concentration, when a gas composed of 10% of carbon monoxide, 10% of carbon dioxide and 80% of hydrogen, and adjusted to the dew point of 65° C., is passed through the catalyst.
Figure 2B:
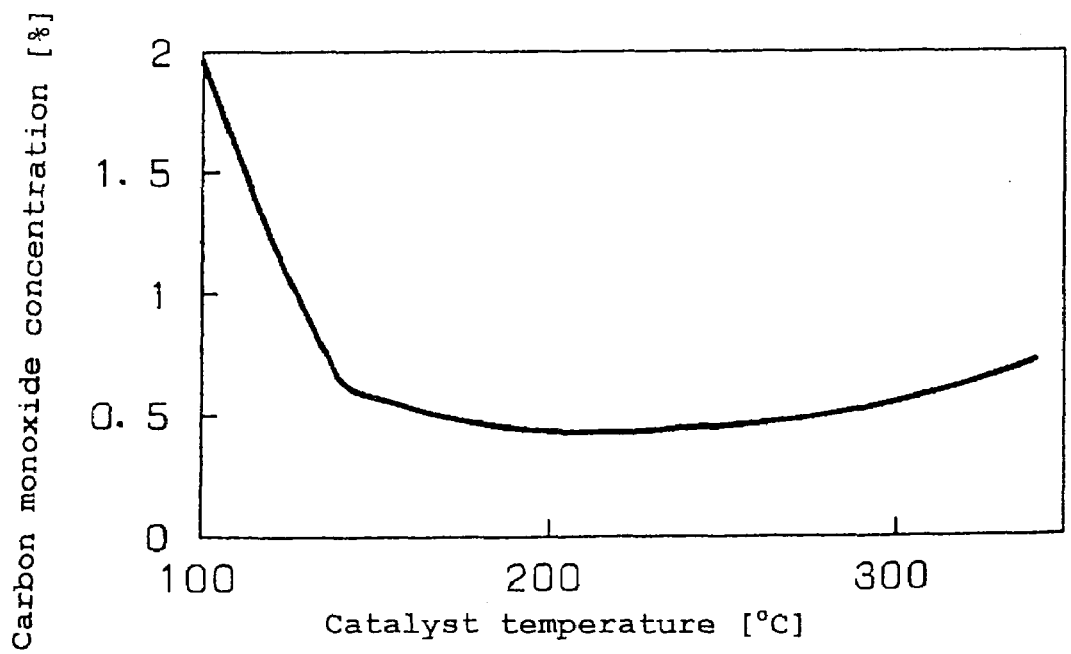

FIG. 2(a) and FIG. 2(b) show the catalyst property of a catalyst made by preparing Pt and an oxide of Ce. In addition, FIG. 2(a) is a view (graph) illustrating the relationship between the catalyst temperature and the carbon monoxide concentration when a gas of 10% of carbon monoxide, 10% of carbon dioxide and 80% of hydrogen, which is adjusted to the dew point of 65° C., is supplied to the catalyst. Furthermore, FIG. 2(b) is a view (graph) illustrating the relationship between the catalyst temperature and the carbon monoxide concentration when a gas of 2% of carbon monoxide, 18% of carbon dioxide and 80% of hydrogen, which is adjusted to the dew point of 65° C., is supplied to the catalyst.

As is shown in FIG. 2(a), when the catalyst temperature is between 300° C. and 500° C., the concentration of the carbon monoxide is 2% or less. In the case where the concentration of the carbon monoxide is high, as the catalyst temperature is decreased, the reaction rate decreases, and so the amount of the carbon monoxide cannot be sufficiently reduced. In addition, when the catalyst temperature is increased, the concentration of the carbon monoxide increases because of the reaction equilibrium. Therefore, in this embodiment, taking 2% of the concentration of the carbon monoxide as a guide, the part located upstream to the hydrogen gas flow of the shifting catalyst body was operated in the temperature range of 300° C. to 500° C. However, it is also shown that under these conditions the amount of the carbon monoxide cannot be sufficiently reduced compared to the widely used, traditional Cu—Zn based catalyst.

As is presented in FIG. 2(b), when the catalyst temperature is low, the temperature equilibrium can reduce the amount of the carbon monoxide. However, a decrease in temperature to some extent decreases the reaction rate, resulting in an increase in the concentration of the carbon monoxide.

Hence, when 0.5% or less of the carbon monoxide, wherein the characteristic is almost the same as that of the widely used, traditional Cu—Zn based catalyst, being taken as a guide, it is shown that setting the catalyst temperature to be between 150° C. and 300° C. can achieve the target level of the CO cleanup efficiency.

As a result, in this embodiment, the apparatus is operated with the part located upstream to the hydrogen gas flow of the shifting catalyst body being set in the temperature range of 300° C. to 500° C. and with the part positioned downstream from the hydrogen gas flow set in the temperature range of 150° C. to 300° C. Therefore, the amount of the carbon monoxide is reduced by decreasing the amount of the carbon monoxide in advance in the upstream side of the shifting catalyst body, and setting the downstream side at a temperature of 300° C. or less can further reduce the amount of the carbon monoxide.

Further, use of the Cu—Zn based catalyst is generally avoided at a temperature of 300° C. or more from the viewpoint of catalyst degradation at high temperature. Thus, a large volume is required to ensure the reactivity of the shifting catalyst. The catalyst used in this example can be employed at a temperature (between 300° C. and 500° C.) higher than the Cu—Zn based catalyst and thus can reduce the catalyst volume as compared to the Cu—Zn based catalyst due to superiority in the reaction rate.

In addition, in this embodiment, the operation of the shifter was confirmed in the above described temperature range by measuring the temperature of the gas before the gas passed through the shifting catalyst body 3a at the shift No. 1 temperature measurement section 9 and by measuring the temperature of the gas after the gas passed through the shifting catalyst body 3a at the shift No. 2 temperature measurement section 10 during the hydrogen gas supply.

Surely, when a hydrocarbon raw material including methane was reformed, the hydrogen gas temperature after the reforming catalyst is about 700° C. Hence, the temperature in the side upstream to the gas flow in the shifting catalyst body can be also controlled by installing means of cooling the hydrogen gas such as air cooling or water cooling, etc. in the gas passage pathway between the reforming section and the shifter.

Next, the gas after the passage of the shifter 3 flows through the gas passage pathway 7 to the cleanup section 4. The gas after the passage of the cleanup section 4 is supplied through the gas passage pathway 7 to the outside. In this time, the gas passes from the air supplying section 8 through the gas passage pathway 7 between the shifter 3 and the cleanup section 4 to the shifter 3 and then to the gas is supplied air. As a result, the concentration of the carbon monoxide in the hydrogen gas is reduced to about 20 ppm.

Furthermore, when the apparatus is used as hydrogen supplying equipment for a solid polymer type fuel cell, the concentration of the carbon monoxide in the hydrogen needs to be reduced to about 20 ppm. However, when the concentration of the carbon monoxide needs not be reduced to such an extent of concentration, an additional reduction structure for such as selectively oxidizing the carbon monoxide is not necessary.

EMBODIMENT 2

Figure 3:
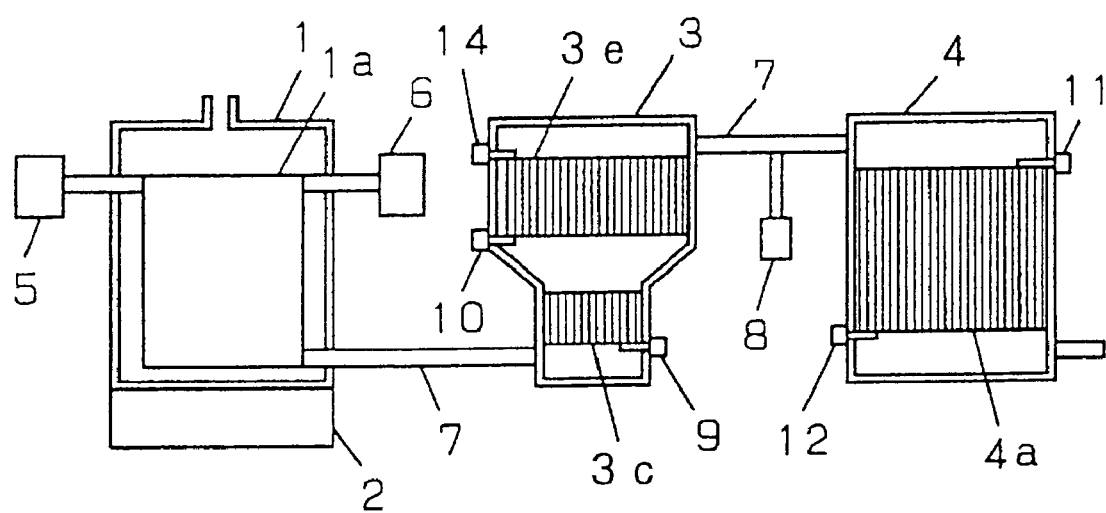
FIG. 3 is a longitudinal section of the principal portions of a hydrogen refining apparatus in an Embodiment 2 of the present invention.

Next, referring to FIG. 3 which illustrates a longitudinal section of the primary part of a hydrogen refining apparatus in the Embodiment 2 of the present invention, the arrangement of the hydrogen refining apparatus in this embodiment will be described.

The arrangement of the hydrogen refining apparatus of this embodiment is almost the same as that of the hydrogen refining apparatus (see FIG. 1) of the previously described Embodiment 1, and so the explanation of the same parts will be omitted and only differences will be explained.

The differences are as follows: (1) the shifting catalyst body of the shifter 3 includes a first shifting catalyst body 3$c$ and a second shifting catalyst body 3$e$, and a shift No. 3 temperature measurement section is installed after the first shifting catalyst body 3$c$, and (2) the cross-sectional area of the first shifting catalyst body 3$c$ at the plane perpendicular to the hydrogen gas flow is set to be smaller than that of the second shifting catalyst body 3$e$ at the plane perpendicular to the hydrogen gas flow.

The hydrogen refining apparatus of this embodiment is operated in much the same way as in the case of the previously described Embodiment 1 of the hydrogen refining apparatus to reduce the amount of the carbon monoxide in the shifter 3.

In addition, in this embodiment, the cross-sectional area of the upstream surface of the shifting catalyst body at the plane perpendicular to the hydrogen gas flow was set as small as about ¼ that of the downstream surface of the shifting catalyst body at the plane perpendicular to the hydrogen gas flow. In other words, the apparatus is characterized in that the flow rate of the hydrogen gas in the part located upstream to the hydrogen gas flow is set to be about four times faster than that in the downstream side. This means that the first shifting catalyst body 3$c$ of the shifting catalyst body, placed upstream to the hydrogen gas flow, is operated at a temperature between 300° C. and 500° C., the temperature of which is higher than that of the second shifting catalyst body 3$e$. This is because when the catalyst temperature is high, a sufficient reaction occurs even though the flow rate of the hydrogen gas is made fast due to an increased reaction rate by the catalyst.

In addition, when the cross-sectional area at the plane perpendicular to the hydrogen gas flow is made small, in terms of apparatus arrangement, the distribution of the hydrogen gas flow at the cross section of the shifting catalyst body is improved and the catalyst is effectively used, and therefore an effect of stabilizing the reduction of the amount of the carbon monoxide at the first shifting catalyst body is produced. Consequently, the shifter can stably reduce the amount of the carbon monoxide.

Furthermore, since the traditionally used Cu—Zn based catalyst is difficult to operate at a catalyst temperature between 300° C. and 500° C. due to a decrease in catalyst activity, and so the reduction of the amount of the carbon monoxide in such an arrangement appears to have a small effect.

EMBODIMENT 3

Figure 4:
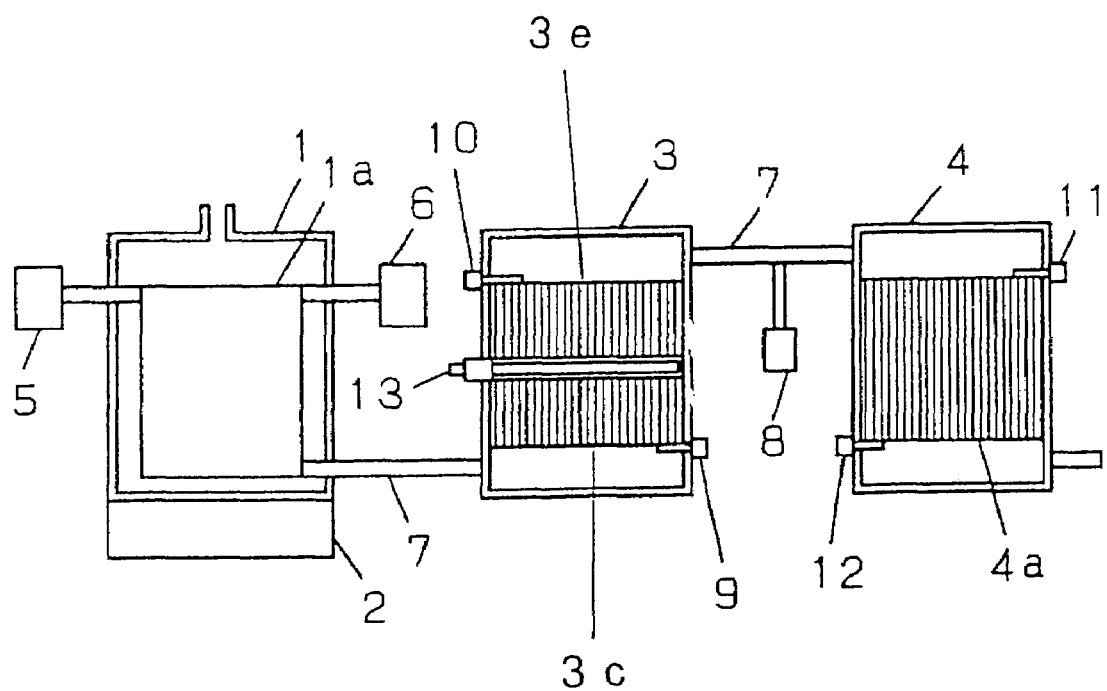
FIG. 4 is a longitudinal section of the principal portions of a hydrogen refining apparatus in an Embodiment 3 of the present invention.

Next, referring to FIG. 4 which illustrates a longitudinal section of the primary part of a hydrogen refining apparatus in the Embodiment 3 of the present invention, the arrangement of the hydrogen refining apparatus in this embodiment will be described.

The arrangement of the hydrogen refining apparatus of this embodiment is almost the same as that of the hydrogen refining apparatus (see FIG. 1) of the previously described Embodiment 1, and so the explanation of the same parts will be omitted and only differences will be explained.

The differences are that a shift cooling section 13 was installed in the shifting catalyst body of the shifter 3. The shift cooling section 13 used water as cooling medium and had a cooling arrangement by heat exchange with hydrogen gas.

The hydrogen refining apparatus of this embodiment is operated in much the same way as in the case of the previously described Embodiment 1 of the hydrogen refining apparatus to reduce the amount of the carbon monoxide in the shifter 3.

However, in the hydrogen refining apparatus of this embodiment, the shifting catalyst body located downstream from the hydrogen gas flow is operated at a temperature between 150° C. and 300° C., with the shift cooling section 13 being operated. Surely, while the arrangement for carrying out cooling was a water cooling structure in this embodiment, any arrangement that cools the hydrogen gas may be employed.

As was explained in the previously described embodiment 1, the upstream section of the shifting catalyst body is operated at a temperature between 300° C. and 500° C., and therefore the sensible heat of the hydrogen gas above 300° C. becomes redundant in the downstream side. In addition, the shift reaction of carbon monoxide with steam is an exothermal reaction (about 41.2 kJ/CO mol).

When the amount of the sensible heat and shift reaction heat exceeds the amount of heat released from the shifter 3, the downstream side of the shifting catalyst body cannot be operated at a temperature between 150° C. and 300° C., leading to an increase in the concentration of the carbon monoxide at the outlet of the shifter (see FIG. 2($b$)).

Hence, the shifting catalyst body positioned downstream from the hydrogen gas flow is controlled so that the temperature of the catalyst body is between 150° C. and 300° C., by running the shift cooling section 13 to remove the redundant amount of heat in the shifter. In such a way, the concentration of the carbon monoxide can be stably reduced to 0.5% or less. In particular, even when the amount of hydrogen gas is increased resulting in an increase in the amount of the sensible heat and shift reaction heat, the concentration of the carbon monoxide can be stably reduced.

EMBODIMENT 4

Figure 5:
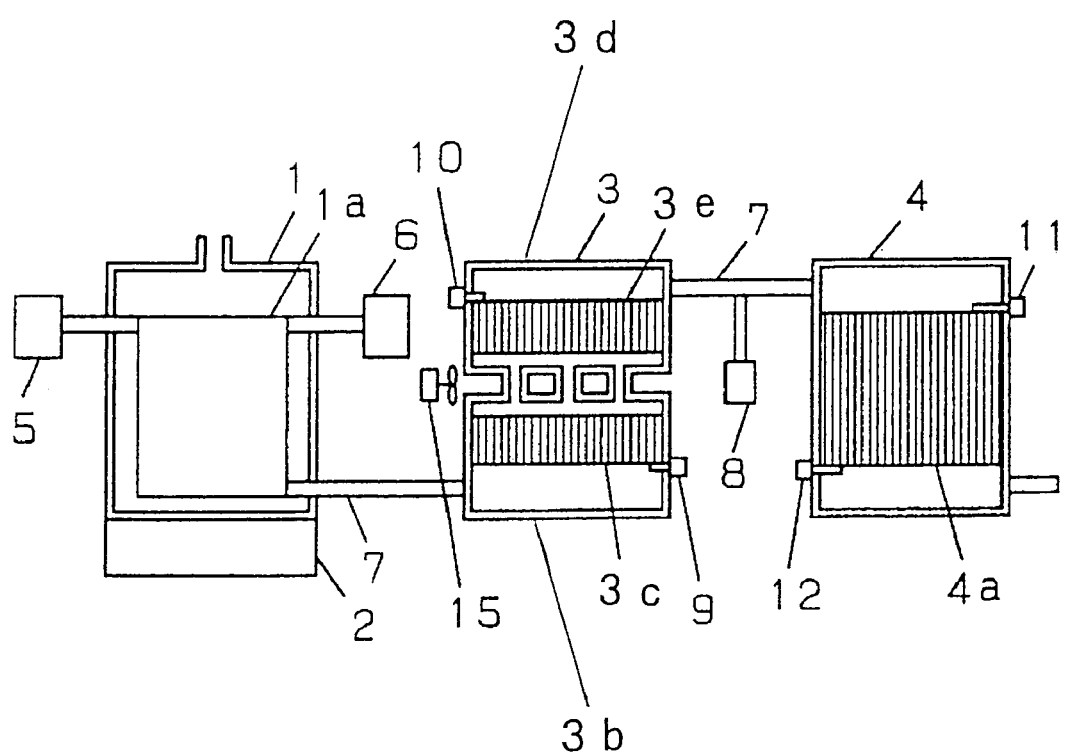
FIG. 5 is a longitudinal section of the principal portions of a hydrogen refining apparatus in an Embodiment 4 of the present invention.

Next, referring to FIG. 5 which illustrates a longitudinal section of the primary part of a hydrogen refining apparatus in the Embodiment 4 of the present invention, the arrangement of the hydrogen refining apparatus in this embodiment will be described.

The arrangement of the hydrogen refining apparatus of this embodiment is almost the same as that of the hydrogen refining apparatus (see FIG. 1) of the previously described Embodiment 1, and so the explanation of the same parts will be omitted and only differences will be explained.

The differences are as follows: (1) the shifter 3 was altered to a first shifter 3b equipped with the first shifting catalyst body 3c and to a second shifter 3d equipped with the second shifting catalyst body 3e; (2) the first shifter was equipped with the shift No. 1 temperature measurement section 9, and the second shifter was equipped with the shift No. 2 temperature measurement section 10; and (3) a shift cooling fan 15, cooling means of dissipating the heat of the hydrogen gas, was installed between the first shifter 3b and the second shifter 3d. In addition, a honeycomb form, not a pellet form, was used as the shifting catalyst.

The hydrogen refining apparatus of this embodiment is operated in much the same way as in the case of the previously described Embodiment 1 of the hydrogen refining apparatus to reduce the amount of the carbon monoxide in the shifter 3.

However, in the hydrogen refining apparatus of this embodiment, the upstream side of the first shifting catalyst body of the first shifter is operated at a temperature between 300° C. and 500° C.; the downstream side of the second shifting catalyst body of the second shifter is operated at a temperature between 150° C. and 300° C.

Furthermore, the temperature of the downstream side of the second shifting catalyst body of the second shifter is controlled by cooling the hydrogen gas by use of the shift cooling fan 15. Since the temperature of the shifting catalyst body depends on the flow rate of the hydrogen gas, the temperature of the shifting catalyst body changes extensively as the flow rate of the hydrogen gas greatly varies. However, in this embodiment, the temperatures of the upstream and downstream sides of the shifting catalyst body come to be mutually little dependent, by dividing the shifter into two parts, the first shifter and the second shifter, resulting in ease of the temperature control of the shifting catalyst body.

Surely, although the temperature of the second shifting catalyst body was controlled based on the temperature of the downstream side of the second shifting catalyst body, the temperature of the second shifting catalyst body may be controlled by installing a temperature measurement section in the upstream side of the second shifting catalyst body to operate the shift cooling fan on the basis of the temperature.

More specifically, a structure for reducing the amount of carbon monoxide through the use of two stages or two layers of the shifter like this embodiment, utilizing the Fe—Cr based catalyst at a relatively high temperature (300° C. to 500° C.) and the Cu—Zn based catalyst at a comparatively low temperature (200° C. to 300° C.) in combination in the shifter, is being used (the Fe—Cr based catalyst as the high temperature section reduces the amount of the carbon monoxide of high concentration; the Cu—Zn based catalyst as the low temperature section reduces the amount of the carbon monoxide to a low concentration). However, in such a structure, the Fe—Cr based catalyst is low in catalyst activity for the carbon monoxide shift reaction, resulting in a larger scale of the shifter. In addition, since the function of both the catalysts is decreased due to oxidation, continuous operation is desirable.

Thus, in this embodiment, a catalyst made by preparing Pt and an oxide of Ce as a noble metal and a metal oxide was used. Because of this, the catalyst offers an excellent oxidation resistance and can cope with the frequent start-up and stop action. In addition, the catalyst is high in catalyst activity for the carbon monoxide shift reaction as compared to the Fe—Cr based catalyst, and so the former provides an effect of the first stage of the shifter being made a smaller scale. Further, controlling the temperature within the shifter, through the use of one shifter, can give an effect of reducing the amount of the carbon monoxide equivalent to the case of the conventional two-stage shifter arrangement (In other words, the simplification of the arrangement can be achieved). Additionally, because the same catalyst body can be used in the shifter, the recovery of the catalyst is simplified, and so the arrangement, which cannot be easily devised in a conventional way, has excellent effects of such as further facilitating catalyst recycling.

Furthermore, the present invention constructed the shifting catalyst body by incorporating a catalyst including Pt and an oxide of Ce in an alumina pellet, but similar results were also provided when any of Pt, Pd, Ru or Rh was used as the noble metal in the shifting catalyst body and any of Ce, Zr or Zn as the metal oxide.

EMBODIMENT 5

At first, referring to FIG. 6, the arrangement of a hydrogen refining apparatus in this embodiment will be explained. In addition, FIG. 6 is a longitudinal section of the primary part of the hydrogen refining apparatus in the Embodiment 5 of the present invention.

Figure 6:
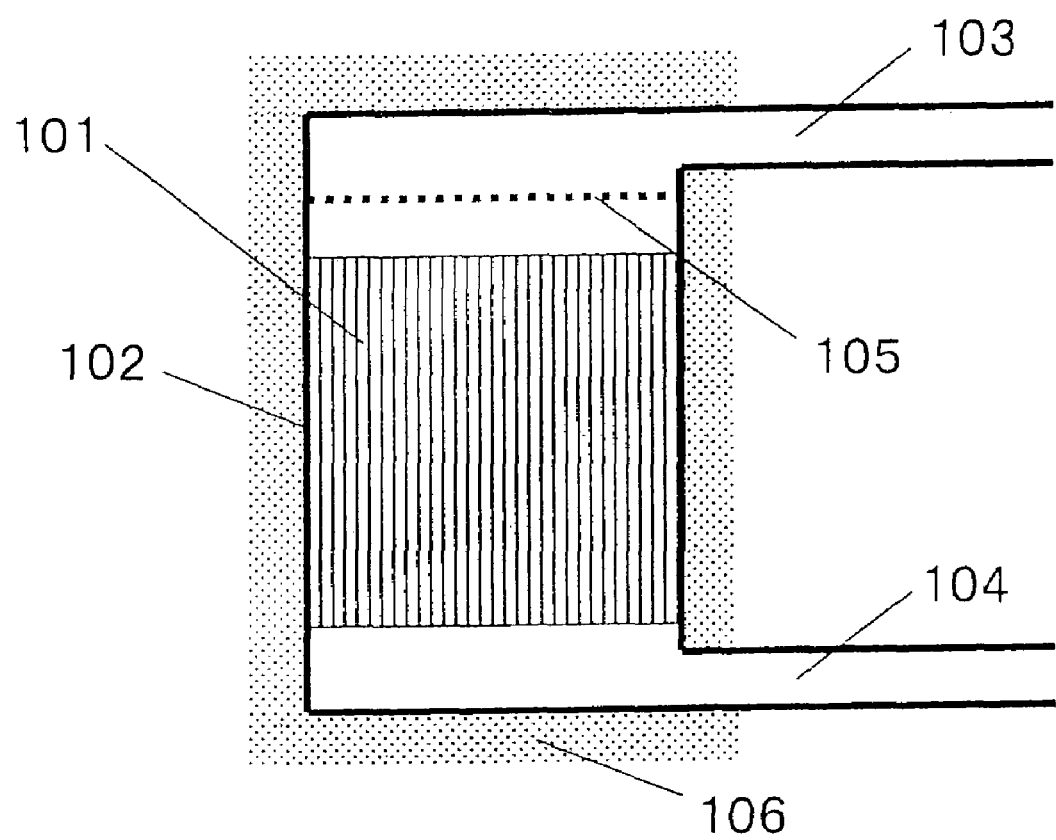
FIG. 6 is a longitudinal section of the principal portions of a hydrogen refining apparatus in an Embodiment 5 of the present invention.

In FIG. 6, a CO shifting catalyst body (also called simply (shifting) catalyst body) 101 is installed inside a reaction chamber 102 and a reformed gas is introduced at a reformed gas inlet 103. The reformed gas that was allowed to react in the CO shifting catalyst body 101 is discharged out of a reformed gas outlet.

In addition, in the upstream side of the catalyst body 101, a diffusing plate 105 is installed so that the reformed gas flows uniformly. Further, in order to keep the reaction vessel at a constant temperature, the outsides of the necessary portions were covered with an insulating material 106 made from ceramics wool.

Here, for the catalyst body 101 was used a material made by coating a cordierite honeycomb with a catalyst prepared by the incorporation of Pt into a composite oxide of cerium (hereinafter referred to as Ce) and zirconia (hereinafter referred to as Zr).

Next, the operation of the hydrogen refining apparatus in this embodiment will be explained.

Fuels used for generating reformed gases supplied to a hydrogen refining apparatus include natural gas, methanol and gasoline; reforming processes include steam reforming by the addition of steam and partial reforming by adding air. Here, the case wherein a reformed gas is obtained by steam reforming natural gas will be depicted.

While the composition of a reformed gas where natural gas is steam reformed slightly varies depending, on the temperature of the reforming catalyst body, the reformed gas includes, as average values excluding steam, about 80% of hydrogen, about 10% of carbon dioxide and about 10% of carbon monoxide.

The reforming reaction of natural gas is conducted in a temperature range of about 500 to 800° C., while the shift reaction wherein CO reacts with steam proceeds at about 150 to 350° C., and so the reformed gas is supplied after the gas is cooled before the reformed gas inlet 103. The CO concentration after the passage of the CO shifting catalyst body 101 is reduced to about 0.5% and then discharged out of a reformed gas outlet 104.

Next, the operation principle of the hydrogen refining apparatus of this embodiment will be explained.

The water-gas shift reaction is an equilibrium reaction that depends on the temperature and the CO concentration can be reduced as the temperature of the reaction is decreased. On the other hand, as the temperature is lowered, the reaction rate associated with catalyst activity is decreased. Therefore, a temperature at which the CO concentration takes a minimal value exists.

Copper base shifting catalysts such as a copper/zinc catalyst and copper/chromium catalyst that are used as CO shifting catalysts in the conventional hydrogen refining apparatus can be used for the water-gas shift reaction at a low temperature of 150 to 250° C. Under certain conditions, the CO concentration can be reduced to about a few hundred to a thousand ppm.

However, copper based catalysts need to be activated by passing a reducing gas such as hydrogen or reformed gas after filled in a reaction vessel and the catalysts' heat resistance is as low as about 300° C. Thus, the reducing gas needs to be diluted by use of an inert gas or the like and then supplied so as not to exceed the heat resistance temperature by reaction heat during the activation, or the reaction needs to be made to occur gradually in a small flow rate and thus needs a long time. In addition, at the time of the start-up of the equipment as well, the catalyst needs to be heated slowly by taking much time to avoid exceeding the heat resistance temperature as a result of an excessive temperature rise. Thus, the catalyst has many problems in applications such as a frequent, repeated start-up and stop operation.

On the other hand, in (the shifter of) the hydrogen refining apparatus of this embodiment, the noble metal catalyst Pt is used as the catalyst body 101 and has a very high heat resistance compared with the copper based catalyst, and therefore no extensive deterioration in the catalyst occurs even when the temperature rises to about 500° C. at the time of the start-up of the equipment. In addition, a long-hour reduction treatment is unnecessary in contrast to the copper based catalyst. Furthermore, even though air is mixed when the equipment is stopped, the degradation of the catalyst is less than that of the copper based catalyst.

Further, since noble metal catalysts with active components such as Pt, Pd, Rh and Ru have high activities, their reaction selectivity is comparatively low. Hence, under certain conditions, the methanation of the CO or the carbon dioxide may proceed as a secondary reaction of the water-gas shift reaction, and so concerns rise that the consumption of the hydrogen arising from the progress of the methanation decreases the efficiency of the whole equipment.

However, normally, in the temperature range of 150 to 500° C., wherein the water-gas shift reaction is conducted, as the temperature increases, the methanation becomes conspicuous, but the yield of methane varies depending on the kinds of noble metals. This is because the adsorption mechanism of CO varies with the kinds of noble metals. Pd, Rd and Ru, which exhibit an adsorption mechanism of CO that makes the methanation liable to proceed, generate methane at relatively low temperature, leading to a narrow temperature range wherein the water-gas shift reaction can be carried out. To the contrary, the Pt catalyst used in this embodiment resists causing the methanation and thus can conduct the water-gas shift reaction in a wide temperature range. Thus, the progress of the methanation does not consume a great amount of hydrogen, and so the hydrogen refining apparatus of this embodiment can be operated effectively.

Furthermore, the addition of Ce as a promoter can enhance the activity of the Pt catalyst for the water-gas shift reaction as well as retard the methanation. The more the proportion of Ce contained in the support, the more the methanation can be restricted. Cerium oxide, when used as a support, offers the highest low temperature activity to the shift reaction and can also retard the methanation.

However, because cerium oxide exhibits a low heat resistance compared to supports such as alumina and zirconia, when it is used in conditions such as at a temperature above 600° C. or when water condensation occurs at the time of start-up or stop of the equipment, it raises the possibility of its catalyst activity being decreased. This is due to the fact that sintering by heat decreases the specific surface area of the cerium oxide, or the cerium oxide, which shows basicity, reacts with the carbon dioxide in the reformed gas.

On the other hand, the hydrogen refining apparatus of the present invention uses a composite oxide prepared by compounding Zr with Ce as the catalyst support, which enhances the stability of the catalyst support resulting in a resistance to the activity decline of the catalyst. Normally, zirconia is relatively stable and offers resistance to a decrease in the specific surface area by heat or to the occurrence of the reaction with the carbon dioxide in the reformed gas. However, zirconia shows a low catalyst activity in a shift reaction at low temperature compared with cerium oxide and also facilitates the methanation at high temperature. Thus, as in the present invention, the composite oxide made by compounding Zr with Ce is used as the catalyst support. For a composite oxide prepared under the coexistence of cerium oxide and zirconia, the exchange of electrons between the cerium oxide and the zirconia is facilitated, so that the catalyst activity in the shift reaction leads to an effect comparable to the case of cerium oxide alone. However, when zirconia and cerium oxide coexist simply without making a composite, no electron exchange occurs, and so this effect is not greatly exerted. In addition, as for the ratio of the Ce to the Zr, as the amount of the Ce is smaller (that is, the amount of the Zr is larger), the heat resistance is increased resulting in a good stability, but with decreasing content of the Ce, the methanation at high temperature is enhanced.

Accordingly, the content of the Ce is preferably 5 atomic percent or more. Note that when the content of the Ce is higher than 90 atomic percent, a level of performance only comparable to the case of cerium oxide is obtainable. Further, a process for compounding Zr with Ce is not specified. For instance, the coprecipitation method, the sol-gel process, the alcoxide method or the like can be used.

In addition, as will be described in detail later referring to Tables 1 and 2, a process for forming a solid solution of cerium oxide and zirconia is available as a process for compounding Zr with Ce to give a composite. When a composite is uniformly formed as a solid solution, the stability of the support is further enhanced and also the progress of the methanation is retarded. When cerium oxide and zirconia exist with neither forming a composite nor forming a solid solution, characteristics of the heat resistance and methanation of respective materials alone are likely to come out. On the other hand, when a solid solution is formed, cerium oxide is integrated into zirconia crystal to restrict the heat deterioration of the cerium oxide, resulting in a heat resistance almost equivalent to that of zirconia alone. Furthermore, since the electron exchange between the cerium oxide and the zirconia is further facilitated, the ability of oxygen supply from the cerium oxide can be maintained. As a result, the stability of the support is promoted and a special effect of retarding the progress of the methanation as well is produced. In addition, the formation of a solid solution can be confirmed via powder X-ray diffraction measurement. The smaller the intensity of the diffraction line of the single phase of the cerium oxide or the zirconia is, the more homogeneous the formation of the solid solution is made.

Incidentally, making the Pt particles small and producing many activity points are required to obtain a sufficient catalyst activity. To this end, Pt is preferably incorporated into a metal oxide of which BET specific surface area is 10 square meters per unit or more. Here, the BET specific surface area refers to the specific surface area evaluated from a well-known measurement method, wherein measurement is carried out by adsorbing nitrogen on powder.

The upper limit of the BET specific surface area is not particularly restrained, and even when the value is 100 to 200 square meters per gram, a similar, high activity is acquired. However, when it reaches 100 square meters per gram or more, the effect arising from an increase in the specific surface area is decreased. When BET specific surface areas of the metal oxide and composite metal oxide are less than 10 square meters per gram, the degree of dispersion of the Pt is reduced without sufficient adsorption of Pt, resulting in an insufficient catalysis activity. Additionally, when the amount of Pt incorporation is decreased in order to reduce the particle size of the Pt, the number of activity points is decreased, leading to an insufficient activity.

Furthermore, in this embodiment, although a composite oxide made by compounding Zr with Ce was used, a further addition of Al reduces the decrease in the specific surface area in a high temperature range, which results in an enhancement of the heat resistance. Also, instead of Zr, compounding only Al gives rise to a similar effect. In summary, the composite oxide of the present invention is simply a composite oxide made by compounding Zr and/or Al with Ce.

In addition, in this embodiment, while a form made by coating a cordierite honeycomb with a catalyst was used as the form of a catalyst body, a procedure, wherein the form of a support is made a pellet form and then a salt of Pt is impregnated to prepare a CO shifting catalyst body, also provides a shifting catalyst body of a similar performance.

EMBODIMENT 6

Next, referring to FIG. 7, the arrangement and operation of a hydrogen refining apparatus in this embodiment will be explained. In addition, FIG. 7 is a longitudinal section of the primary part of the hydrogen refining apparatus in the Embodiment 6 of the present invention.

Figure 7:
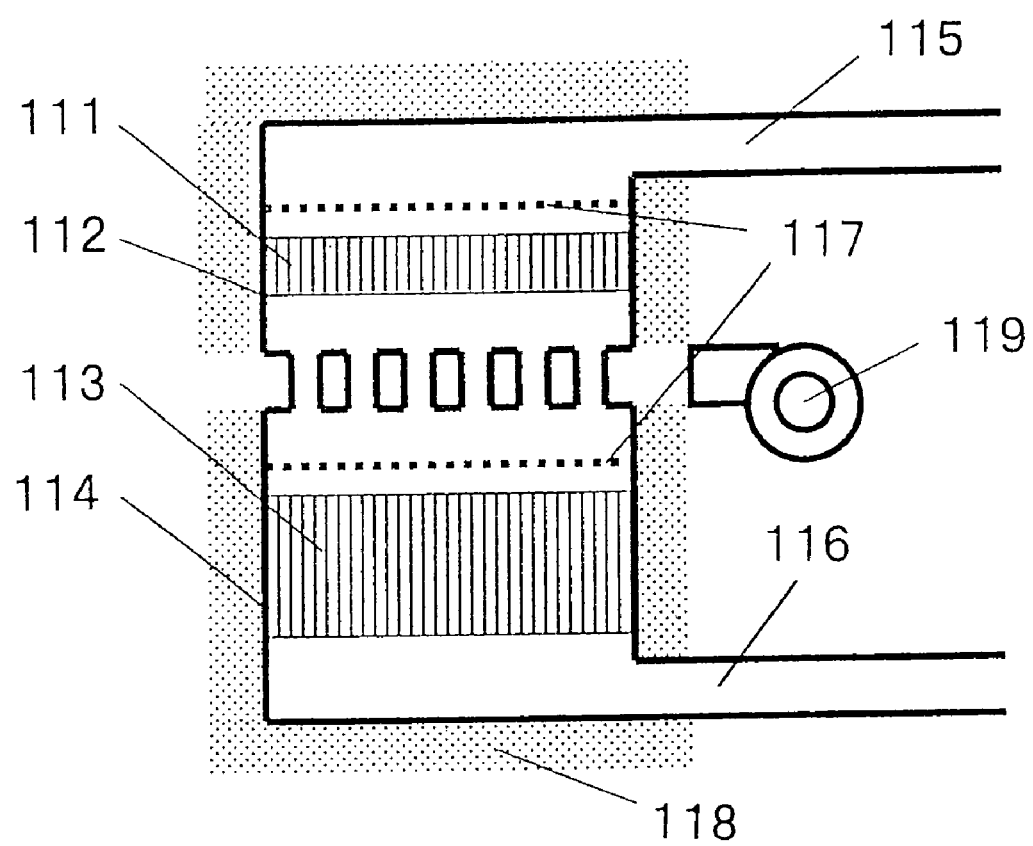
FIG. 7 is a longitudinal section of the principal portions of a hydrogen refining apparatus in an Embodiment 6 of the present invention.

The hydrogen refining apparatus in this embodiment, as shown in FIG. 7, is made by dividing the catalyst body into two stages and installing a cooling section in a midway of the catalyst body. Most of the effect of action is similar to the case of the Embodiment 5. Therefore, this embodiment will be explained focusing on primarily the differences.

The catalyst body is divided into a No. 1 catalyst body 111 and a No. 2 catalyst body 113, with a cooling section being installed in between, and a cooling fan 119 (hydrogen gas temperature adjustment section) cools the reformed gas. The CO concentration can be reduced using a small amount of catalyst. This is because reaction heat produced in the upstream section of the catalyst body is transported to the downstream section via the reformed gas due to the fact that the water-gas shift reaction is an exothermal reaction. As a result, the temperature of the catalyst body tends to be higher in the downstream section, and so even though the CO concentration is sufficiently reduced in the upstream section, the CO concentration is again increased in the downstream section of high temperature because of the reverse reaction. Therefore, the reverse reaction can be restrained by lowering the temperature of the No. 2 catalyst body 113 in the downstream side relative to that of the No. 1 catalyst body 111.

In addition, a composite oxide with a large content of Ce is desirably used for the catalyst body 111 in the upstream side, the temperature of which tends to be high. This is because the use of a composite oxide with a large content of Ce in the upstream side, the temperature of which tends to be high, can extend the operation temperature range that can promote the water-gas shift reaction leading to easier control of the apparatus, even in the high temperature region where the operation of the apparatus is restricted by the methanation.

Further, the methanation is reduced to proceed by use of a composite oxide with a small content of Ce in the downstream section where the condensation of water is likely to occur at the time of start-up, so that such a decline of the characteristic caused by water as previously described can be constrained, leading to an elongation of the endurance life.

Additionally, while, in the above described embodiment, the catalyst body was divided into the two stages: the No. 1 catalyst body 111 and the No. 2 catalyst body 113, the number of stages is not particularly specified, and if a structure wherein the temperature in each stage of the catalyst body is optimally controlled, a high characteristic can be achieved (For example, the same goes for the previously described Embodiment 4).

EXAMPLE 1

A shifting catalyst used in this example was prepared by dispersively incorporating Pt into $CeO_2$ and then sintering, by use of both $CeO_2$ and a salt solution of Pt (a nitrate of a dinitrodiamine platinum complex). The catalyst body was made by coating an alumina pellet (3 mm in diameter, 3 mm in length) with this $CeO_2$ into which Pt was incorporated (the amount of Pt incorporated is 3% by weight). A shifting catalyst body was also prepared by coating a cordierite honeycomb 100 mm in diameter and 50 mm in length. Further, a honeycomb form has a merit of being more easily able to be adjusted the surface area per volume with the number of cells per area compared with a pellet form.

A shifting catalyst body was also made by a similar method using Zr or Zn, or Ce and their mixture or their solid solution as the metal oxide. In addition, for comparison, a conventional Rh—Ce based catalyst was prepared as well in the same way described above.

As a result, the shifting catalyst of this example has been shown to offer a better CO cleanup efficiency than the conventional Rh—Ce based catalyst.

EXAMPLE 2

The decline of catalyst activity of the Pt—Ce based catalyst of the present invention was compared with that of the conventional Cu—Zn based catalyst.

When a Pt—Ce based catalyst was used, even though the action of start-up and stop was repeated 10 times or more, almost no deterioration of catalyst activity of the catalyst body in the shifter was observed. This is because the Pt—Ce based catalyst is rarely affected by the decline of the catalyst activity caused by oxidation.

For the use of a Cu—Zn based catalyst, in the case of the equipment for which the action of the start-up and stop was conducted 10 times or more, the concentration of the carbon monoxide at a site after the shifter was about twice that of the case where the start-up was conducted once, indicating that the catalyst activity was reduced. This is because the catalyst is oxidized resulting in the decline of its activity during the start-up and stop operation.

Therefore, the Pt—Ce based catalyst of this example exhibits a resistance to the decline of its catalyst activity as compared with the conventional Cu—Zn based catalyst.

EXAMPLE 3

Comparison was made between the characteristics of a Pt—Ce based catalyst and a Rh—Ce based catalyst as shifting catalysts in this example, using the arrangement of the hydrogen refining apparatus shown in FIG. 1.

Since the fundamental characteristics as a shifting catalyst were rarely affected by the deterioration of catalyst activity caused by oxidation, the Rh—Ce based catalyst showed characteristics almost equivalent to those of the Pt—Ce base shifting catalyst. However, because the Rh—Ce based catalyst was better than Pt in the activity for the methanation of the carbon dioxide or the carbon monoxide with the hydrogen, the concentration of the methane in the gas after the shifter was slightly increased. In comparison at a catalyst temperature of 300° C., the concentration of the methane for the Pt—Ce base shifting catalyst was 0.1% (on a dry basis), while that of the Rh—Ce base shifting catalyst was 0.2% (on a dry basis), but the concentrations of the carbon monoxide at the outlets were a constant value.

Surely, the extent of such an increase in the methane concentration does not influence practical uses, and so the Rh—Ce based catalyst can be used as a shifting catalyst as well.

In addition, not only the combinations of Pt and the Rh catalyst indicated here showed the activity of catalyst, but also other noble metals were confirmed to exhibit similar shift reactivities, although their characteristics slightly vary depending on respective noble metals.

EXAMPLE 4

The shift reactivities of the various shifting catalysts indicated in the Example 1 were confirmed in each example.

As a result, catalysts prepared using Zr or Zn, or Ce and their mixture or their solid solution as the metal oxide were confirmed to serve as shifting catalyst bodies excellent in the oxidation resistance the Cu—Zn base shifting catalyst does not offer. However, shift reactivities slightly varied depending on respective metal oxides.

For example, when Zr was used, the methanation of the carbon dioxide or the carbon monoxide with the hydrogen was likely to proceed and the methane concentration at the outlet of the shifter tended to increase slightly. Although depending on the catalyst conditions, in comparison at a catalyst temperature of 300° C., the concentration of the methane for a Pt—Ce base shifting catalyst was 0.1% (on a dry basis), while that of a Pt—Zr base shifting catalyst was 0.15% (on a dry basis).

In addition, when Zn was used, because its ability of oxygen donation is superior to that of Ce at low temperature, the shift reactivity at low temperature tended to be enhanced, but when used at high temperature (for example, 500° C. or more), the tendency of reduction of an oxide of Zn was increased, leading to the tendency of a decrease in the catalyst activity. However, it was confirmed that not only a combination with an oxide of Ce shows catalyst activity, but also other metal oxides exhibit equivalent shift reactivities.

EXAMPLE 5

An example of the operation of the hydrogen refining apparatus in the previously described Embodiment 1 will be presented.

At first, the hydrogen gas supplying section was operated. By the use of methane gas as raw material, a steam reforming was conducted by adding three moles of water to one mole of methane gas to generate hydrogen gas containing about 10% of carbon monoxide and about 10% of carbon dioxide. This hydrogen gas was supplied to the shifter to promote the shift reaction, leading to the reduction of the carbon monoxide. During this time, the part located upstream to the hydrogen gas flow of the shifting catalyst body was operated in the temperature range of 300° C. to 500° C. and the part positioned downstream from the hydrogen gas flow was operated in the temperature range of 150° C. to 300° C.

In addition, the amount of noble metal per volume of the shifting catalyst body in the upstream section was the same as that of the shifting catalyst body in the downstream section. When the apparatus was operated at the above described temperatures, the carbon monoxide was sufficiently subjected to shift reaction in the shifter, leading to a reduction to about 0.5%.

Here, two Comparative Examples that were not operated at the above described catalyst temperatures will be shown. When the upstream temperature of a catalyst was set at 250° C., the shift reaction in the catalyst in the upstream section rarely proceeded and the concentration of the carbon monoxide after the shift was reduced to only about 2%. In addition, when the upstream temperature of the catalyst was set at a temperature above 500° C., the amount of the carbon monoxide was not sufficiently reduced because of the equilibrium reaction, with the concentration of the carbon monoxide at the shift outlet being not more than 0.5%.

Further, when the temperature of a catalyst is high, the carbon monoxide and carbon dioxide react with the hydrogen to yield methane. As the amount of the noble metal of a catalyst is increased, the tendency is increased. The methanation is not desirable because of its consumption of the hydrogen.

In this example, the apparatus was operated, with the amount of noble metal in a half of the shifting catalyst body located upstream to the hydrogen gas flow being set equal to about ¼ of the amount of noble metal in a half of the downstream side, to see the tendency. As compared with the case where the amounts of noble metals were the same, the amount of the methane was confirmed to be reduced to about ½. On the other hand, the concentrations of the carbon monoxide at the outlets were almost the same value, not more than 0.5%.

As can be seen from this example, the amount of noble metal in the part located upstream to the flow of the hydrogen gas used at a relatively high temperature can be reduced compared with that in the part located downstream from the hydrogen gas flow.

EXAMPLE 6

An example of the operation of the hydrogen refining apparatus in the previously described Embodiment 2 will be presented.

While the operation was carried out under almost the same conditions and equipment arrangement as shown in the above described Example 5, the cross-sectional area of the shifting catalyst body in the upstream side, at a plane perpendicular to the hydrogen gas flow, was reduced to about ¼ of the cross-sectional area of the shifting catalyst body in the downstream side, at a plane perpendicular to the hydrogen gas flow. As a result, the flow rate of the hydrogen gas of the part located upstream to the hydrogen gas flow becomes about four times larger than that of the part located in the downstream side. However, the concentration of the carbon monoxide at the shift outlet could be reduced to about 0.5%. This is because, when the catalyst temperature is high, the reaction rate at the catalyst is increased, and so the reaction occurs sufficiently even though the flow rate of the hydrogen gas is increased.

Next, a comparison with the Example 5 will be conducted. In the Example 5, the cross-sectional area of the shifting catalyst body in the upstream side is the same as that of the shifting catalyst body in the downstream side. Accordingly, as compared with the Example 5, the flow rate of the shifting catalyst body at the upstream side is about four times. In addition, the height of the catalyst load in the shifter was taken almost equal to the height of the catalyst in the upstream side. In other words, the amount of catalyst loaded is reduced compared with the case of the Example 5. When the amount of catalyst loaded in the Example 5 case is taken as 1, the amount of loading in this example is about ¾.

However, it became possible to reduce the concentration of the carbon monoxide to the concentration equivalent to that in the case of the Example 5. This is due to the fact that, when the cross-sectional area at a plane perpendicular to the hydrogen gas flow is reduced, the apparatus arrangement enhances the flow distribution of the hydrogen gas at the cross section and so the catalyst can be used effectively, and therefore the effect of stabilizing the reduction of the amount of the carbon monoxide in the first shifting catalyst body is produced. As a result, even though the amount of shifting catalyst loaded is reduced, it is possible to stably reduce the amount of the carbon monoxide.

EXAMPLE 7

An example of the operation of the hydrogen refining apparatus in the previously described Embodiment 3 will be presented. In this example, the shift cooling section 3 uses water as a cooling medium and its arrangement is characterized by conducting cooling through the gas/liquid heat exchange with the hydrogen gas.

When the operation was carried out under almost the same conditions and equipment arrangement as shown in the above described Example 5, no large problems were caused. However, when the amount of hydrogen gas supplied to the shifter was increased, the sensible heat of the hydrogen gas became redundant in the downstream side. In addition, the shift reaction of the carbon monoxide with the steam is exothermic. When this amount of sensible heat and shift reaction heat exceeds the amount of heat released out of the shifter 3, the downstream side of the shifting catalyst body cannot sometimes work at a temperature between 150° C. and 300° C. For example, under the conditions shown in the Example 5, when the amount of hydrogen gas to be supplied was made twice, the downstream side of the shifting catalyst body could not be operated at 300° C. or less, resulting in an increase in the concentration of the carbon monoxide at the outlet.

Thus, in this example, with the operation of the shift cooling section being conducted, the downstream side of the shifting catalyst body was operated at a temperature between 150° C. and 300° C. As a result, the amount of the carbon monoxide at the outlet of the shifter was reduced to not more than 0.5%.

EXAMPLE 8

An example of the operation of the hydrogen refining apparatus in the previously described Embodiment 4 will be presented.

The operation was carried out under almost the same conditions and equipment arrangement as shown in the above described Example 7. That is, the concentration of the carbon monoxide at the outlet of the shifter was confirmed by varying the amount of hydrogen gas supplied to the shifter. Since the temperature of the shifting catalyst body depends on the hydrogen gas flow rate, when the hydrogen gas flow rate varies extensively, the temperature of the shifting catalyst body changes greatly as well.

However, the shifter is divided into the two sections of the first shifter and the second shifter as demonstrated in this example to reduce the mutual dependence of the temperatures of the upstream and downstream sides of the shifting catalyst body on their temperatures, leading to an easy temperature control of the shifting catalyst bodies. As a result, it is possible to stably reduce the concentration of the carbon monoxide at the outlet of the shifter. In addition, the apparatus was confirmed to be able to stably operate when the amount of hydrogen gas reaches about four times that of the case in the Example 5.

EXAMPLE 9

One percent by weight of Pt was incorporated into the metal oxides or composite oxides 1 to 15 of which compositions are given in Table 1. Cordierite honeycombs were coated with these oxides and then were installed in a reaction chamber 112 (see FIG. 6).

A reformed gas consisting of 8% carbon monoxide, 8% carbon dioxide, 20% steam and hydrogen (the rest) was introduced at a flow rate of 10 liters per minute at a reformed gas inlet 113 (see FIG. 6). After the temperature of the reformed gas was controlled to react in the catalyst body 111 (see FIG. 6), the composition of the gas discharged out of a reformed gas outlet 114 (see FIG. 6) was determined by gas chromatography.

The lowest values of the CO concentrations and the concentrations of the methane in the gas after the reaction at a catalyst temperature of 400° C. were measured. Further, the action of stopping the equipment and then re-starting it was repeated 10 times and then the CO concentrations were measured to evaluate the changes in activities of the catalysts. These results are summarized in Table 1.

TABLE 1

| | | CO concentrations after 10 time repetitions of start-up and stop action (%) | | |
|---|---|---|---|---|
| Sample No. | Metal oxides or composite oxides | | CO concentrations (%) | Concentrations of methane at 400° C. (%) |
| 1 | Cerium oxide | | 0.13 | 0.65 | 0.01 |
| 2 | Alumina | | 1.25 | 1.25 | 2.25 |

TABLE 1-continued

CO concentrations after 10 time repetitions of start-up and stop action (%)

| Sample No. | Metal oxides or composite oxides | CO concentrations (%) | | Concentrations of methane at 400° C. (%) |
|---|---|---|---|---|
| 3 | Zirconia | 0.62 | 0.63 | 1.52 |
| 4 | Ce0.95Zr0.05Ox | 0.13 | 0.64 | 0.03 |
| 5 | Ce0.9Zr0.1Ox | 0.13 | 0.15 | 0.05 |
| 6 | Ce0.5Zr0.5Ox | 0.13 | 0.14 | 0.10 |
| 7 | Ce0.05Zr0.95Ox | 0.14 | 0.14 | 0.30 |
| 8 | Ce0.03Zr0.97Ox | 0.50 | 0.51 | 1.02 |
| 9 | Ce0.01Zr0.99Ox | 0.55 | 0.56 | 1.25 |
| 10 | Ce0.95Al0.5Ox | 0.13 | 0.64 | 0.02 |
| 11 | Ce0.9Al0.1Ox | 0.13 | 0.14 | 0.05 |
| 12 | Ce0.5Al0.5Ox | 0.13 | 0.13 | 0.12 |
| 13 | Ce0.05Al0.95Ox | 0.15 | 0.15 | 0.33 |
| 14 | Ce0.03Al0.97Ox | 0.66 | 0.67 | 0.81 |
| 15 | Ce0.01Al0.99Ox | 0.89 | 0.90 | 1.20 |

The experimental results shown in Table 1 attest the previously described following facts. For instance, cerium oxide (ceria) exhibits an extremely high activity for the shift reaction and can restrain the methanation, but it tends to show a decline in catalyst activity as a result of the repetition of the start-up and stop action of the equipment, as compared with alumina, zirconia or the like. Additionally, when a composite oxide prepared by compounding Zr with Ce is used as a catalyst support, as the proportion of the Ce decreases, (1) the decline in the activity of the catalyst is hard to occur, but (2) the methanation is likely to proceed in the high temperature region, for instance.

Incidentally, for the samples in the experiment of which results are shown in Table 1, the intensity of the diffraction peak measured by the X-ray diffraction measurement is about 20%, and so the ceria, zirconia or alumina remains as a single phase; that is, a solid solution is not formed sufficiently. Thus, samples of solid solutions whose sufficient formation was confirmed by the disappearance of the diffraction peak assigned to the single phase of ceria, zirconia or alumina were used and the experimental results are listed in Table 2.

TABLE 2

CO concenttrations after 10 time repetitions of start-up and stop action (%)

| Sample No. | composite oxides | CO concentrations (%) | | Concentrations of methane at 400° C. (%) |
|---|---|---|---|---|
| 16 | Ce0.95Zr0.05Ox | 0.13 | 0.55 | 0.02 |
| 17 | Ce0.9Zr0.1Ox | 0.13 | 0.14 | 0.04 |
| 18 | Ce0.5Zr0.5Ox | 0.13 | 0.14 | 0.06 |
| 19 | Ce0.05Zr0.95Ox | 0.14 | 0.14 | 0.20 |
| 20 | Ce0.03Zr0.97Ox | 0.50 | 0.51 | 0.80 |
| 21 | Ce0.01Zr0.99Ox | 0.55 | 0.56 | 1.10 |
| 22 | Ce0.95Al0.5Ox | 0.13 | 0.54 | 0.02 |
| 23 | Ce0.9Al0.1x | 0.13 | 0.14 | 0.03 |
| 24 | Ce0.5Al0.5OX | 0.13 | 0.13 | 0.07 |
| 25 | Ce0.05Al0.95Ox | 0.15 | 0.15 | 0.25 |
| 26 | Ce0.03Al0.97Ox | 0.65 | 0.65 | 0.50 |
| 27 | Ce0.01Al0.99Ox | 0.89 | 0.90 | 1.05 |

From the experimental results given in Tables 1 and 2, (a) a degradation in a catalyst that is likely to occur when the proportion of ceria is high and (b) the methanation that tends to occur when the proportion of zirconia or alumina is high are shown to be considerably retarded by sufficiently forming a solid solution. In addition, the coprecipitation method, the sol-gel process, the alcoxide method, etc. can be utilized as methods for forming a homogeneous solid solution.

Furthermore, when the atomic percent of Ce is 90 or more like in the sample 4 in Table 1 and in the sample 16 in Table 2, and when the atomic percent of Ce is 5 or less like in the samples 13 to 15 in Table 1 and the samples 25 to 27 in Table 2, the results are not so good in both the CO concentration (after 10 time start-up and stop actions) and the concentration of the methane at 400° C. However, as described above, (1) at a temperature between 300° C. and 500° C. in the upstream side, and (2) at a temperature of 300° C. or less in the downstream side, of the (carbon monoxide) shifting catalyst body, results more desirable than in the cases of the previously described conventional example can be acquired.

In addition, Al, like Zr, is inclined to form a composite oxide with Ce and is also stable as a simple substance of $Al_2O_3$. Therefore, though concrete data are omitted, also when a composite oxide made by compounding (a) Al, or (b) Zr and Al, with Ce, was used, results were obtained similar to those when a composite oxide made by compounding Zr with Ce was used.

EXAMPLE 10

Into a composite oxide having a 1-to-1Zr-to-Ce ratio, in atomic number, with the Zr and Ce being indicated in the sample 6 in Table 1, used in the Example 9, was incorporated 1% by weight of Pt. As cordierite honeycombs coated with this oxide, the No. 1 catalyst body 111 (see FIG. 7) and the No. 2 catalyst body 113 (see FIG. 7), the total volume of which was made equal to that in the Example 1, were installed, respectively, in the No. 1 reaction chamber 112 (see FIG. 7) and in a No. 2 reaction chamber 114 (see FIG. 7).

A reformed gas consisting of 8% carbon monoxide, 8% carbon dioxide, 20% steam and hydrogen (the rest) was introduced at a flow rate of 10 liters per minute at a reformed gas inlet 115 (see FIG. 7). The lowest value of the CO concentration and the concentration of the methane in the gas after a reaction in the No. 1 catalyst body 111 at a temperature of 400° C. were 0.09% and 0.06%, respectively. Further, the action of stopping the equipment and then re-starting it was repeated 10 times and then the CO concentration was measured to confirm the change in activity of the catalyst; the CO concentration was 0.11%.

In this way, when the catalyst in this example was used, both of the CO concentration and the methane concentration were lower than in the case where the catalyst body utilizing the sample 6 in the Example 1 was used. Therefore, it has been attested that the cooling section explained in the Embodiment 2 facilitates the progress of the reaction directed toward the reduction of the CO concentration and contributes to a high efficiency operation of the hydrogen refining apparatus.

EXAMPLE 11

In the Example 10, the ratios of Ce to Zr of 9 to 1 and 1 to 9 in the composite oxides used in the No. 1 catalyst body 111 (see FIG. 7) and the No. 2 catalyst body 113 (see FIG. 7), respectively, were set and the content of Ce in the catalyst body of the upstream side was made larger. Similarly to the Example 2, the lowest value of the CO concentration and the concentration of the methane in the gas after a reaction in the No. 1 catalyst body 111 at a temperature of 400° C. were determined to be 0.09% and 0.01%, respectively. Further, the action of stopping the equipment and then re-starting it was repeated 10 times and then the CO concentration was measured to confirm the change in activity of the catalyst; the CO concentration was 0.09%.

In this way, when the catalyst in this example was used, both of the CO concentration and the methane concentration have a tendency to be lower than in the case where the catalyst body in the Example 10 was used. In particular, this tendency is remarkable for the methane concentration. Thus, as described above, it has been attested that the use of a composite oxide of a large content of Ce in the upstream side, of which temperature is likely to be high, restrains the progress of the methanation to promote a high efficiency operation of the hydrogen refining apparatus.

COMPARATIVE EXAMPLE 1

Instead of a composite oxide, wherein Pt is incorporated, of the present invention, in this comparative example, a conventional copper zinc catalyst was used as a catalyst body 101 (see FIG. 6), and like the Example 9, the catalyst was installed in the reaction chamber 102 (see FIG. 6). A reformed gas consisting of 8% carbon monoxide, 8% carbon dioxide, 20% steam and hydrogen (the rest) was introduced at a flow rate of 10 liters per minute at a reformed gas inlet 103 (see FIG. 6). After the temperature of the reformed gas was controlled to react in the catalyst body 101, the composition of the gas discharged out of a reformed gas outlet 104 (see FIG. 6) was determined by gas chromatography; the lowest value of the CO concentration was 0.08%. Further, the action of stopping the equipment and then re-starting it was repeated 10 times and then the CO concentration was measured to confirm the change in activity of the catalyst; the lowest value of the CO concentration was 4%.

Like this, when the catalyst body in this comparative example was used, the CO concentration after 10-time start-up and stop actions is remarkably high as compared with the case by use of the catalyst body in the previously described example. Hence, as described previously, it has been attested that the hydrogen refining apparatus of the present invention, even when the action of stopping the equipment and then re-starting it was repeated, is rarely affected by mixing of oxygen, for example and works stably for a long while.

To sum up, the present invention relates to a hydrogen refining apparatus that comprises a shifter having a shifting catalyst body containing noble metals and metal oxides, and a hydrogen gas supplying section that supplies hydrogen gas containing carbon monoxide to the shifter, with (1) the temperature of the shifting catalyst body upstream to the hydrogen gas flow being set to be substantially between 300° C. and 500° C. and (2) the temperature of the shifting catalyst body downstream from the hydrogen gas flow being set to be substantially at 300° C. or less (Surely, the present invention also includes a hydrogen refining apparatus that comprises a shifting (reaction) section with a plurality of stages having a shifting catalyst body containing noble metals and metal oxides, and a hydrogen gas supplying section that supplies hydrogen gas containing carbon monoxide to the shifter with a plurality of stages, the temperature of a stage of the shifter with a plurality of stages being higher in a more upstream side relative to the hydrogen gas flow).

In addition, (1) between the hydrogen gas supplying section and the shifter, or (2) between stages of the shifting catalyst body (the whole or part), may be installed cooling sections used for cooling the hydrogen gas.

As is obvious from the descriptions thus far, a hydrogen refining apparatus of the present invention is characterized in that the apparatus includes, for example, a shifter having a shifting catalyst body containing noble metals and metal oxides as component materials, and a hydrogen gas supplying section that supplies hydrogen gas containing at least carbon monoxide and steam as minor components to the shifter, with the shifter being a shift reaction section having a plurality of shifting catalyst bodies, and with the temperature of a shifting catalyst body of the shift reaction section, located downstream from the hydrogen gas flow, being set lower than that of the shift reaction section positioned in the upstream side.

Further, this apparatus includes a first shifter and a second shifter, the temperature of the shifting catalyst body of the first shifter is maintained in the range of 300° C. to 500° C., and the temperature of the shifting catalyst body of the second shifter is set between 150° C. and 300° C.; the amount of noble metals per volume of the catalyst body of the first shifter is set to be smaller than that of the catalyst body of the second shifter; and in the above described means, a cooling section for cooling the hydrogen gas may be provided between the first shifter and the second shifter.

Still further, the above described apparatus includes a hydrogen gas temperature adjusting section is installed between the hydrogen gas supplying section and the shifter to control the upstream temperature of the shifting catalyst body of the shifter in the range of 300° C. and 500° C., the noble metal of the shifting catalyst body contains at least one species of Pt, Pd, Ru and Rh, and the metal of the metal oxide of the shifting catalyst body contains at least one species of Ce and Zr.

With the above described measures, the present invention provides a stably hydrogen-supplying, hydrogen refining apparatus of a simple arrangement that can stably reduce the carbon monoxide in the shifter so as to be able to effectively reduce the carbon monoxide in the clean up section.

Therefore, the present invention could easily provide an apparatus which realizes a stable supply of hydrogen, which, for example, allows the shifter to perform the stable carbon monoxide reduction characteristic in the shifting catalyst having Pt and metal oxides as component materials in the shifter of the hydrogen refining apparatus that supplies hydrogen by steam reforming hydrocarbon components.

In addition, the present invention, for example, relates to a hydrogen refining apparatus having a reformed gas supplying section that supplies a reformed gas containing at least hydrogen gas, carbon monoxide and steam, and having a reaction chamber that contains a carbon monoxide shifting catalyst body and is located downstream from the above described reformed gas supplying section, with the above described carbon monoxide shifting catalyst body being made by incorporating at least Pt into a composite oxide made by compounding Ce with at least Zr and/or Al.

In this case, the composite oxide is preferably composed of 5 to 90 atomic % Ce and Zr and/or Al (the rest). Further, the composite oxides are in the form of a solid solution. In addition, preferably, the carbon monoxide shifting catalyst body is divided into a plurality of stages, and heat releasing sections or cooling sections are installed between catalyst bodies. Furthermore, in the composite oxide, the Ce content is preferably lower in the side downstream relative to the direction of the reformed gas flow than in the upstream side.

Further, although Pt was incorporated into the composite oxide in the above described embodiment of the present invention, this is not limited; that is, at least one of Pt, Pd, Rh and Ru may be selected. However, a noble metal catalyst having Pd, Rh, Ru, etc. as an active component may make the methanation proceed as described previously, and so Pt is most preferably utilized. Thus, even when Pd, Rh, Ru, etc. are used, at least Pt is incorporated into the above described composite oxides; Pt is desirably added to these oxides as a requisite.

In this manner, hydrogen refining equipment of the present invention improves the durability of the CO shifting catalyst body and can work stably when the start-up and stop action of the equipment was repeated.

In addition, the entire disclosure of the above descriptions are incorporated herein by reference in its entirety.

INDUSTRIAL APPLICABILITY

As is clear from the descriptions thus far, the present invention has the advantage that a hydrogen refining apparatus having a good CO cleanup efficiency can be provided, for instance, even when the start-up and stop operations are frequently repeated.

The invention claimed is:

1. A hydrogen refining apparatus comprising:
a shifter comprising a shifting catalyst body converting carbon monoxide, said shifting catalyst body comprising one or more noble metals and a shifting catalyst support comprising a metal oxide; and
a hydrogen gas supplying section supplying a flow of hydrogen gas containing carbon monoxide to said shifter;
wherein said noble metal is selected from the group consisting of Pt, Pd, Rh, Ru, and mixtures thereof, and
said metal oxide is a composite oxide made by compounding Zr with Ce.

2. The hydrogen refining apparatus according to claim 1, wherein said composite oxide, excluding oxygen, comprises 5 to 90 atomic percent of Ce.

3. The hydrogen refining apparatus according to claim 2, wherein said composite oxide is a solid solution.

4. The hydrogen refining apparatus according to claim 3, wherein the composition proportion of Ce in said shifting catalyst support is larger in a more upstream side relative to the flow of hydrogen gas.

5. The hydrogen refining apparatus according to claim 1, wherein (1) between said hydrogen gas supplying section and said shifter, or (2) between said shifting catalyst bodies in respective stages is installed a cooling section used for cooling the hydrogen gas.

* * * * *

UNITED STATES PATENT AND TRADEMARK OFFICE
CERTIFICATE OF CORRECTION

PATENT NO. : 7,279,142 B2  Page 1 of 1
APPLICATION NO. : 10/980463
DATED : October 9, 2007
INVENTOR(S) : Kunihiro Ukai et al.

It is certified that error appears in the above-identified patent and that said Letters Patent is hereby corrected as shown below:

On the Title Page Item -30-, Foreign Application Priority Data
Please delete duplicate entry of "Aug.18, 2000 (JP) 2000-248363"

On the Title Page Item -30-, Foreign Application Priority Data
Please delete duplicate entry of "Oct. 23, 2000 (JP) 2000-323062"

On the Title Page Item -57- line 7, Abstract
Please delete "." after C

Signed and Sealed this

Thirteenth Day of May, 2008

JON W. DUDAS
*Director of the United States Patent and Trademark Office*